(12) United States Patent
Ishida et al.

(10) Patent No.: US 7,977,846 B2
(45) Date of Patent: Jul. 12, 2011

(54) ROTOR FOR VEHICULAR ALTERNATING CURRENT GENERATOR

(75) Inventors: Hiroshi Ishida, Anjo (JP); Mitsuru Kato, Kakamigahara (JP); Craig McKeehan, Maryville, TN (US)

(73) Assignee: Denso Corporation, Kariya (JP)

( * ) Notice: Subject to any disclaimer, the term of this patent is extended or adjusted under 35 U.S.C. 154(b) by 517 days.

(21) Appl. No.: 11/902,441

(22) Filed: Sep. 21, 2007

(65) Prior Publication Data
US 2008/0079330 A1  Apr. 3, 2008

(30) Foreign Application Priority Data
Oct. 2, 2006 (JP) ................................ 2006-270859

(51) Int. Cl.
*H02K 1/22* (2006.01)
(52) U.S. Cl. ........... 310/263; 310/216.116; 310/216.121
(58) Field of Classification Search .................. 310/263, 310/216.121, 216.116
See application file for complete search history.

(56) References Cited

U.S. PATENT DOCUMENTS

| | | | | |
|---|---|---|---|---|
| 3,242,364 A * | 3/1966 | Johnson | ......................... | 310/263 |
| 3,271,604 A * | 9/1966 | Priddy | ........................... | 310/234 |
| 3,392,294 A * | 7/1968 | Campbell | ...................... | 310/168 |
| 3,548,226 A * | 12/1970 | Sato | ............................ | 310/68 D |
| 3,571,637 A * | 3/1971 | Henningsen et al. | ..... | 310/156.72 |
| 3,671,906 A * | 6/1972 | Hodges et al. | ................ | 336/208 |
| 4,377,762 A * | 3/1983 | Tatsumi et al. | ................ | 310/263 |
| 4,588,911 A * | 5/1986 | Gold | ................................ | 310/62 |
| 4,588,915 A * | 5/1986 | Gold et al. | ..................... | 310/194 |
| 5,254,896 A * | 10/1993 | Bradfield et al. | ............. | 310/263 |
| 5,629,575 A * | 5/1997 | Cazal et al. | ....................... | 310/91 |
| 5,789,832 A * | 8/1998 | Hwang | .............................. | 310/43 |
| 5,831,368 A * | 11/1998 | Hatsios et al. | ................ | 310/263 |
| 6,114,786 A | 9/2000 | Ishida et al. | | |
| 6,455,958 B1 * | 9/2002 | Asao et al. | ....................... | 310/51 |
| 6,541,890 B2 * | 4/2003 | Murata et al. | ................. | 310/263 |
| 6,924,580 B2 * | 8/2005 | Tajima et al. | ................. | 310/263 |
| 7,053,508 B2 * | 5/2006 | Kusase et al. | ................... | 310/64 |
| 2002/0047485 A1 * | 4/2002 | Okawa | .......................... | 310/263 |
| 2002/0117935 A1 * | 8/2002 | Kanazawa et al. | ............ | 310/263 |
| 2004/0017128 A1 * | 1/2004 | York et al. | ..................... | 310/263 |

(Continued)

FOREIGN PATENT DOCUMENTS

JP        A-56-98349        8/1981

(Continued)

OTHER PUBLICATIONS

Oct. 21, 2010 Office Action issued in Japanese Patent Application No. 2006-270859 (with translation).

*Primary Examiner* — Quyen Leung
*Assistant Examiner* — Alex W Mok
(74) *Attorney, Agent, or Firm* — Oliff & Berridge PLC

(57) ABSTRACT

A rotor for a vehicular alternating current generator has a relief space portion formed between axial holes of a pair of pole cores and a shaft for receiving therein a plastically deformed portion produced when the shaft is press-fitted in the axial holes of the pole cores. The relief space portion is located adjacent to a pair of closely contacting inner end faces of the pole cores so that the plastically deformed portion is let to move into a radially outward direction rather than further continuing movement in an axial direction within the relief space portion. The plastically deformed portion is thus prevented from entering between the inner end faces of the pole cores.

6 Claims, 4 Drawing Sheets

U.S. PATENT DOCUMENTS

| | | | |
|---|---|---|---|
| 2004/0056559 A1* | 3/2004 | Laxenaire et al. | 310/263 |
| 2007/0132337 A1* | 6/2007 | Harada | 310/263 |

FOREIGN PATENT DOCUMENTS

| | | |
|---|---|---|
| JP | A-4-190669 | 7/1992 |
| JP | 05153758 A * | 6/1993 |
| JP | 05284676 A * | 10/1993 |
| JP | U-5-92520 | 12/1993 |
| JP | A 10-257723 | 9/1998 |
| JP | A-11-166948 | 6/1999 |
| JP | A 11-318066 | 11/1999 |
| JP | A 2000-125528 | 4/2000 |
| JP | 2001141035 A * | 5/2001 |
| JP | A-2004-336965 | 11/2004 |
| JP | A-2004-343970 | 12/2004 |
| JP | 2005192345 A * | 7/2005 |

\* cited by examiner even pressure is applied on the entire circumferential periphery of the rotary shaft. ...

ROTOR FOR VEHICULAR ALTERNATING CURRENT GENERATOR

CROSS REFERENCE TO RELATED APPLICATION

The present application is based on and claims priority from Japanese Patent Application No. 2006-270859, filed Oct. 2, 2006, the content of which is incorporated herein by reference.

BACKGROUND OF THE INVENTION

1. Field of the Invention

The present invention relates generally to a rotor of a vehicular alternating current generator adapted to be installed in a motor vehicle, truck or the like, and more particularly to a fitting structure between a rotary shaft and a pair of Lundell type pole cores of the rotor.

2. Description of the Related Art

Conventional rotors for vehicular alternating current generators include a pair of Lundell type pole cores each having an axial hole in which a rotary shaft is press-fitted, and a field coil wound on the pole cores. The rotors of this type will be sometimes called "Lundell type rotors". In the Lundell type rotors, inner end faces of the pair of Lundell type pole cores are in close contact with each other for flux penetration. A typical example of such conventional rotors for vehicular alternating current generator is disclosed in Japanese Patent Laid-open Publication (JP-A) No. 2000-125528.

To achieve a firm securement between the pair of Lundell type pole cores and the rotary shaft, there is a frequently used technique in which a rotary shaft having a knurled groove on its outer peripheral surface is press-fitted in axial holes of the pair of Lundell type pole cores. With this press-fitting, inner peripheral surfaces of the axial holes undergo plastic deformation and are displaced into the knurled groove of the rotary shaft with the result that the Lundell type pole cores are firmly secured on the rotary shaft against rotation relative to the shaft.

However, a plastically deformed portion of the inner peripheral walls of the axial holes, as it moves into the knurled groove of the rotary shaft during press-fitting operation, is displaced not only in a circumferential direction and a radial inward direction, but also in an axial direction toward a downstream side of the press-fitting direction of the rotary shaft. With this axial displacement of the plastically deformed portion of the inner peripheral walls, the inner end face of one Lundell type pole core, which is located on a downstream side as viewed from the press-fitting direction of the rotary shaft, is forced to displace downstream in the press-fitting direction of the rotary shaft, tending to create an axial space or gap between the inner end faces of the Lundell type pole cores. The axial gap will increase the magnetic resistance of a field magnetic flux circuit.

To avoid this problem, an attempt may be made to keep the pair of Lundell type pole cores in a tightly clamped condition during the press-fitting operation. However, the attempted tight clamping would require a large-sized production machine and cause undesired plastic deformations on the Lundell type pole cores. This problem may be relieved by increasing the radial cross-sectional area of the knurled groove, which may however result in a reduction in anchorage strength between the rotary shaft and the Lundell type pole cores.

SUMMARY OF THE INVENTION

It is accordingly an object of the present invention to provide a rotor for a vehicular alternating current generator, which is easy to produce, can provide a sufficient anchorage strength between Lundell type pole cores, is able to prevent an increase in magnetic resistance, and is capable of suppressing the occurrence of undesired plastic deformations caused due to press-fitting operation.

To achieve the foregoing object, the present invention is embodied in a rotor for a vehicular alternating current generator, which includes a rotary shaft, a pair of Lundell type pole cores, each of the pole cores having an axial hole in which the rotary shaft is press-fitted, a field coil wound on the pair of Lundell type pole cores, and axial inner end faces of the pair of Lundell type pole cores being in close contact with each other. Such Lundell type rotor is per se well known in the art.

According to a first aspect of the present invention, the rotor has a relief space portion formed adjacent the axial inner end faces between the axial holes of the pair of Lundell type pole cores and the rotary shaft. The relief space portion receives therein a plastically deformed portion produced when the rotary shaft is press-fitted in the axial holes of the pair of Lundell type pole cores. The relief space portion has an average radial space width which is set to be larger than an average radial space width between the axial holes and the rotary shaft at a substantially press-fitted portion of the rotary shaft and the axial holes located axially outward of the relief space portion.

With this arrangement, since the radial space width between the axial holes of the Lundell type pole cores and the rotary shaft is made larger at a first portion located adjacent to the inner end faces of the Lundell type pole cores than at the substantially press-fitted portions located on both axial outer sides of the first portion, the plastically deformed portion, as it moves downstream in the press-fitting direction along the axial hole of the upstream-side Lundell type pole core during press-fitting operation, reaches the relief space portion whereupon the plastically deformed portion is let to displace in a radial outward direction rather than further continuing the movement in the axial downstream direction. Furthermore, due to the presence of the relief space portion, there is no chance that another plastically deformed portion is newly created in the vicinity of the inner end faces of the pair of Lundell type pole cores. It is, therefore, possible to avoid the occurrence of a problem that the newly created plastically deformed portion enters between the inner end faces of the pole cores and creates an undesired axial space or gap between the inner end faces. Additionally, since the plastically deformed portion is no longer displace in the axial direction to a greater extent, it is possible to prevent undue increase in driving load on the rotary shaft and hence suppress generation of a strain deformation on the rotary shaft. Thus, the present invention is able to realize a rotor for a vehicular alternating current generator, which is easy to manufacture, can retain a sufficient anchorage strength between Lundell type pole cores, is able to prevent an increase in magnetic resistance, and is capable of suppressing the occurrence of undesired plastic deformations caused due to press-fitting operation.

The relief space portion is preferably provided to extend over the entire circumference of the rotary shaft. It is also possible for the relief space portion to be provided either along a part of the entire circumference of the rotary shaft, or at a predetermined pitch in the circumferential direction of the rotary shaft. Furthermore, the relief space portion may be formed in either one or both of the pair of Lundell type pole cores.

Preferably, the relief space portion is formed into an annular configuration. By thus forming the relief space portion, the above-mentioned advantageous functional effects can be attained over the entire circumference of a contacting portion between the axial holes and the rotary shaft.

In one preferred form of the invention, the relief space portion is formed in a part of the axial holes. By thus forming the relief space portion on the axial hole side, it is possible to prevent reduction in torsional stiffness of the rotary shaft.

Alternatively, the relief space portion may be formed in a part of the rotary shaft. By thus forming the relief space portion on the rotary shaft side, it is possible to prevent reduction in cross sectional area of the magnetic path.

Preferably, the rotary shaft has a pair of knurled grooves formed on an outer peripheral surface thereof at both axially outer sides of the relief space portion and fitted in the respective axial holes of the pair of Lundell type pole cores, and a small-diameter portion disposed between the pair of knurled grooves and having a diameter smaller than an average diameter of the knurled grooves. The relief space portion is defined radially outward of the small-diameter portion of the rotary shaft. With this arrangement, the plastically deformed portion, which is produced on the inner peripheral surfaces of the axial holes by the knurled grooves, can be received in the relief space portion.

In another preferred form of the invention, the axial holes are made larger in diameter at a first portion located near the axial inner end faces than at a second portion located near axial outer end faces, the relief space portion is defined radially inward of the first portion of the axial holes, and the rotary shaft has a knurled groove on an outer peripheral surface thereof. With this arrangement, the plastically deformed portion, which is formed on the inner peripheral surfaces of the axial holes by the knurled groove, can be received in the relief space portion.

According to a second aspect of the present invention, the rotor has a plurality of knurled portions formed on an outer peripheral surface thereof at predetermined axial pitch, and a plurality of relief space portions each disposed between two adjacent ones of the knurled portions. The relief space portions have an average radial space width, which is set to be larger than an average radial space width between the respective knurled portions and the axial holes.

With this arrangement, since each of the relief space portions is disposed between two adjacent one of the plural knurled portions that are formed on the outer peripheral surface of the rotary shaft at the predetermined axial pitch, the relief space portions are arranged at the same predetermined axial pitch along the knurled portions of the single rotary shaft. By thus arranging the relief space portions, it is readily possible to accommodate an excess plastically deformed portion in the relief space portions, thereby facilitating easy driving of the rotary shaft into the axial holes of the pole cores.

The term "average radial space width" is used herein to refer to a circumferentially-averaged value of radial spaces measured at a predetermined axial or longitudinal portion of the rotary shaft. Accordingly, in the case of knurled grooves, the average radial space width can be given as the average of measurements on a maximum diameter portion and measurements on a minimum diameter portion.

Similarly, the term "knurled groove" is used herein to refer to a series of alternating parallel grooves and ridges of substantially corrugated configuration formed circumferentially on the outer peripheral surface of the rotary shaft.

DETAILED DESCRIPTION OF THE PREFERRED EMBODIMENTS

Figure 1:
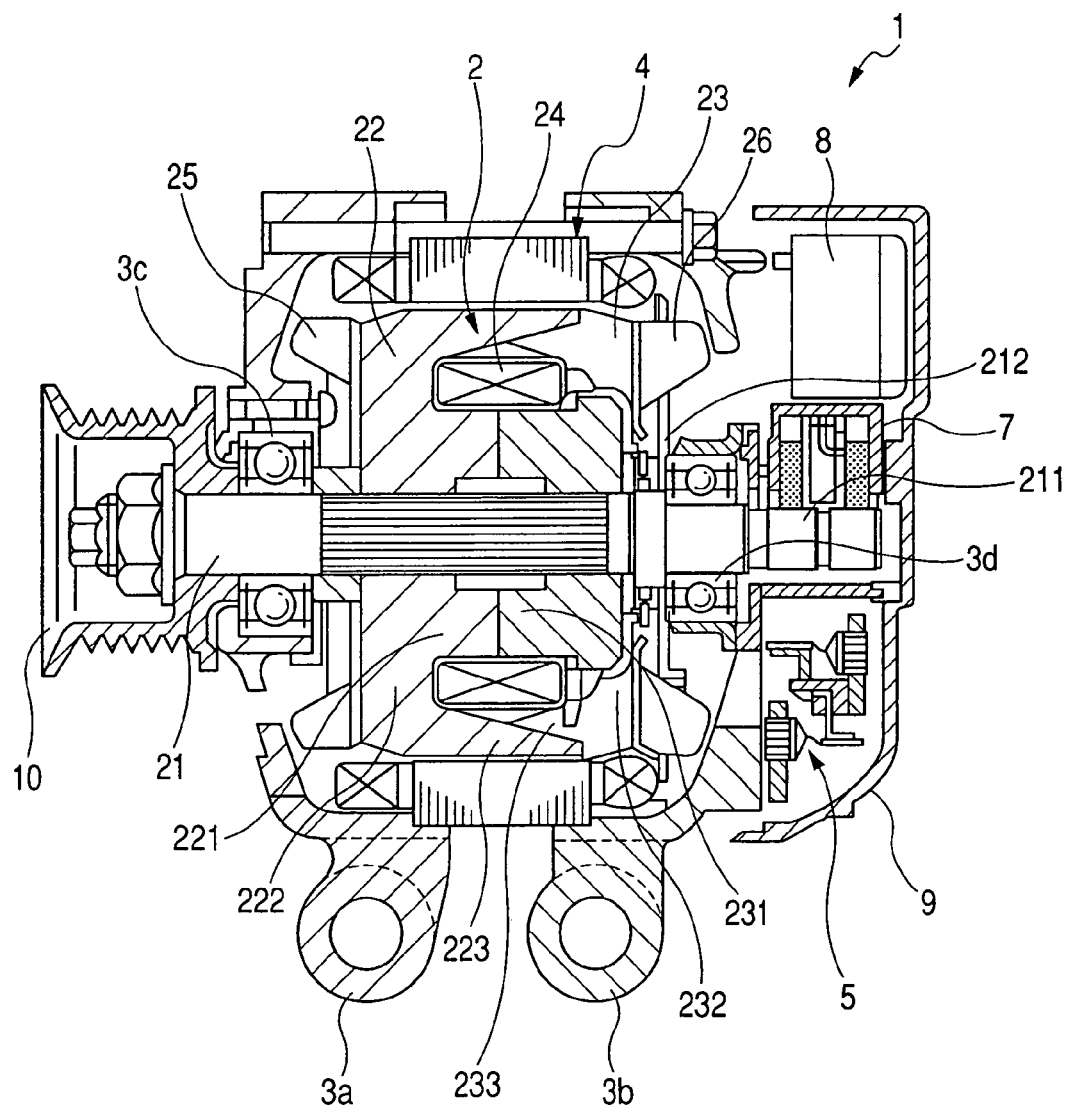
FIG. 1 is an axial cross-sectional view of a vehicular alternating current generator including a rotor according to a first embodiment of the present invention.

Referring now to the drawings and FIG. 1 in particular, there is shown in axial cross section a vehicular alternating current generator 1 in which a Lundell type rotor according to a first embodiment of the present invention is incorporated.

The vehicular alternating current generator 1 includes a rotor 2 rotatably driven by an engine (not shown) via a belt (not shown) and a pulley 10, a stator 4 operating as an armature, front and rear frames 3a and 3b that support the rotor 2 and the stator 4 via a pair of bearings 3c and 3d, a rectifying device 5 connected to the stator 4 for converting alternating current output to direct current output, a brush unit 7 which holds brushes for supplying field current to a rotor coil (field coil) 24 wound on the rotor 2, a voltage control device or controller 8 for controlling an output voltage, and a protective cover 9 formed from a synthetic resin material and attached to the rear frame 3b. The protective cover 9 covers the rectifying device 5, the voltage controller 8 and the brush unit 7 that are attached to a rear end face of the rear frame 3b.

Figure 3:
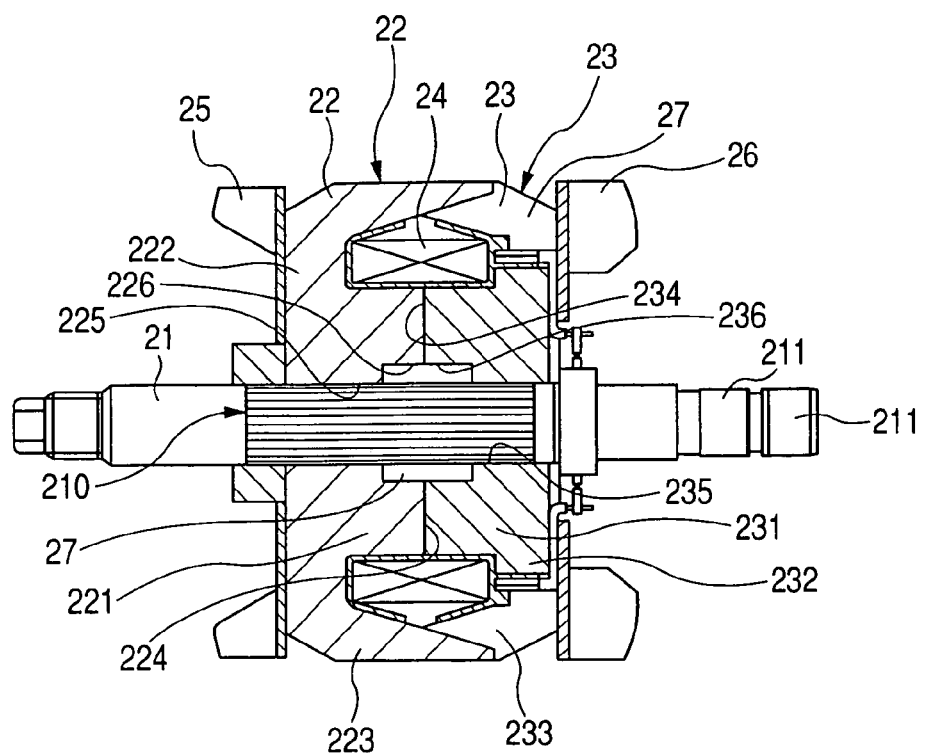
FIG. 3 is an axial cross-sectional view of the rotor shown in FIG. 1.

Next, the rotor 2 will be described in greater detail with reference to FIGS. 1 and 3.

The rotor 2 generally comprises a shaft (rotary shaft) 21, a pair of pole cores (Lundell type pole cores) 22 and 23, the rotor coil (field coil) 24, a front cooling fan 25, and a rear cooling fan 26. The pole cores 22, 23 each have a central boss portion 221, 231 with which an insulating bobbin carrying thereon the rotor coil 24 is press-fitted, a disc portion 222, 232 extending from an axial outer end of the boss portion 221, 231 in a radial outward direction, and eight pawl-shaped portions (pawl-shaped magnetic poles) 223, 233 extending from an outer end of the disc portion 222, 232 in a radial outward direction. The pole cores 22 and 23 are disposed in axial juxtaposition with each other so that the pawl-shaped magnetic poles 223, 233 are oriented to embrace the rotor coil 24. The pole cores 22 and 23 have end faces (inner end faces) 224 and 234 at the respective boss portions 221 and 231. The inner end face 224 of the boss portion 221 of the pole core 22 and the inner end face 234 of the boss portion 231 of the pole core 23 are in close contact with each other.

Figure 2:
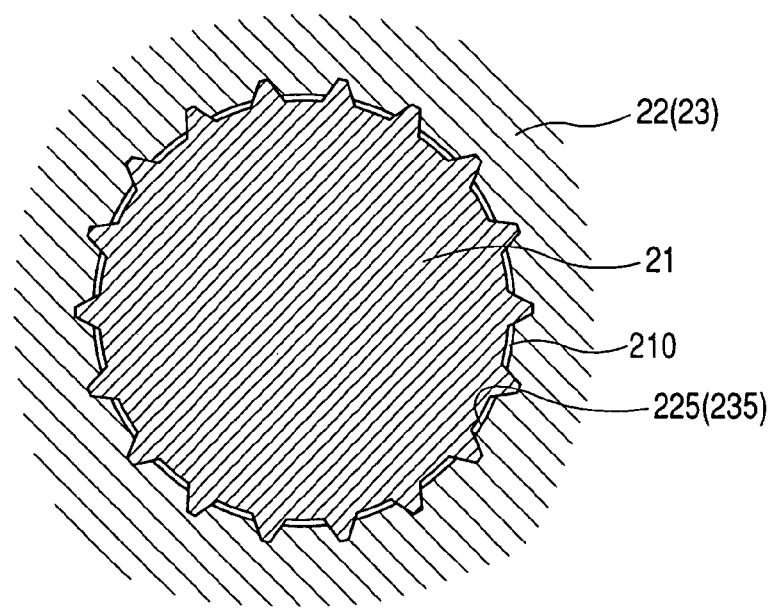
FIG. 2 is a radial cross-sectional view showing a knurled groove formed in a rotary shaft of the rotor.

The shaft 21 is press-fitted in axial holes 225, 235, which are located at the respective centers of the pole cores 22, 23 and extending axially through the pole cores 22, 23. The shaft 21 has a knurled groove 210 formed on an outer peripheral surface thereof at a position engageable with at least the axial holes 225, 235 of the pair of pole cores 22, 23. FIG. 2 shows a cross-sectional shape of the knurled groove 210. Press-fitting the shaft 21 into the axial holes 225, 235 of the pole cores 22, 23 causes the inner peripheral surfaces of the axial holes 225, 235 to undergo plastic deformation and the pole cores 22, 23 are firmly fitted with the shaft 21 against rotation relative to the shaft 21. A pair of slip rings 211, 211 and two lead wires 212 (FIG. 1) electrically connected to the slip rings 211 are formed integrally with the shaft 21 through a hold forming process. After press-fitting operation, opposite ends of the rotor coil 24 are connected via the lead wires 212 to the slip rings 211.

Next, a description will be made to a relief space portion 27 with reference to FIG. 3.

The relief space portion 27 is disposed at portions of the axial holes 225, 235 located adjacent to the inner end faces 224, 234 of the boss portions 221, 231 that are closely contacting with each other. The relief space portion 27 extends axially outward from the inner end faces 224, 234 in opposite directions.

The relief space portion 27 is formed into an annular configuration as it is defined by large-diameter portions 226, 236 of the respective axial holes 225, 235, which are made larger in diameter than the other portions of the axial holes 225, 235. The relief space portion 27 has a volume, which is determined by the diameter of the large-diameter portions 226, 236 such that all of the plastically deformed portions, which are produced during the press-fitting operation mainly from the inner peripheral surfaces of the axial holes 225, 235 and gather together around the inner end faces 224, 234, can be received in the relief space portion 27.

In this instance, however, the diameter of the large-diameter portions 226, 236 of the axial holes 225, 235 should be larger than an average diameter of the knurled groove 210. On the other hand, the foregoing volume of the relief space portion 27, which is set to be large enough to accommodate all of the plastically deformed portions, is not an indispensable requirement for the relief space portion 27. The relief space portion 27 may have a smaller volume. Furthermore, the relief space portion 27 may be provided on one of the pair of the pole cores 22, 23.

With the relief space portion 27 thus provided, the shaft 21 can be easily press-fitted in the axial holes 225, 235 without involving undesired plastic deformation and without causing an axial gap between the pole cores, which may lead to reduction of magnetic flux.

Figure 4:
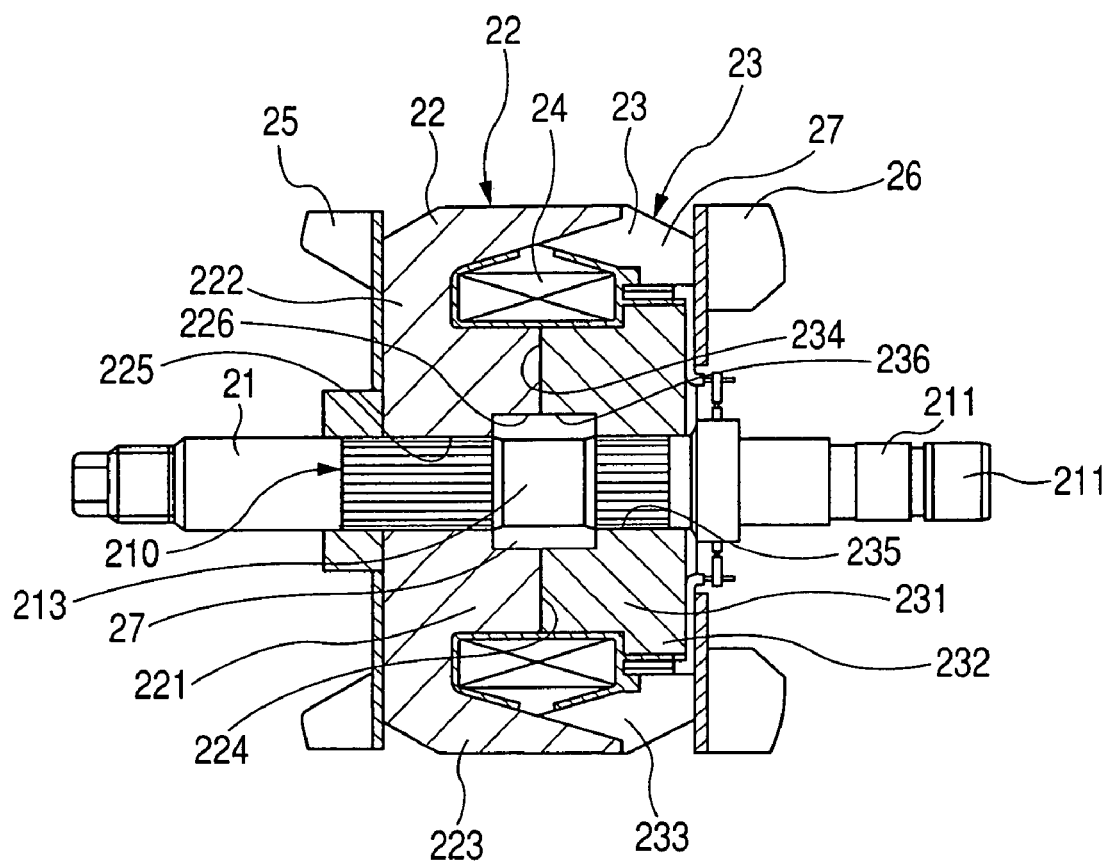
FIG. 4 is an axial cross-sectional view of a rotor according to a second embodiment of the present invention.

FIG. 4 shows in axial cross section a Lundell type rotor according to a second embodiment of the present invention. The second embodiment differs from the first embodiment described above with reference to FIGS. 1 to 3 in that in combination with the large-diameter portions 226, 236 of the axial holes 225, 236, a small-diameter portion 213 of the shaft 21 is used. The small-diameter portion 213 is formed by reducing the diameter of an axial or longitudinal portion of the shaft 21, which is corresponding in position to the large-diameter portions 226, 236 of the axial holes 225, 235.

In the second embodiment shown in FIG. 1, a relief space portion 27 is defined between the large-diameter portions 226, 236 of the axial holes 225, 235 and the small-diameter portion 213 of the shaft 21. The relief space portion 27 has an annular configuration. By thus providing the small-diameter portion 213 in combination with the large-diameter portions 226, 236, it is possible to increase the volume of the relief space portion 27 without reducing the magnetic path cross-sectional area of the boss portions 221, 231.

According to modifications of the present invention, the relief space portion 27 may be formed by removing the ridges of the knurled groove 210 on the shaft 21. As an alternative, the relief space portion 27 may be formed solely by the small-diameter portion 27 of the shaft 21. In the latter case, the relief space portion 27 is formed only in a part of the shaft 21.

Figure 5:
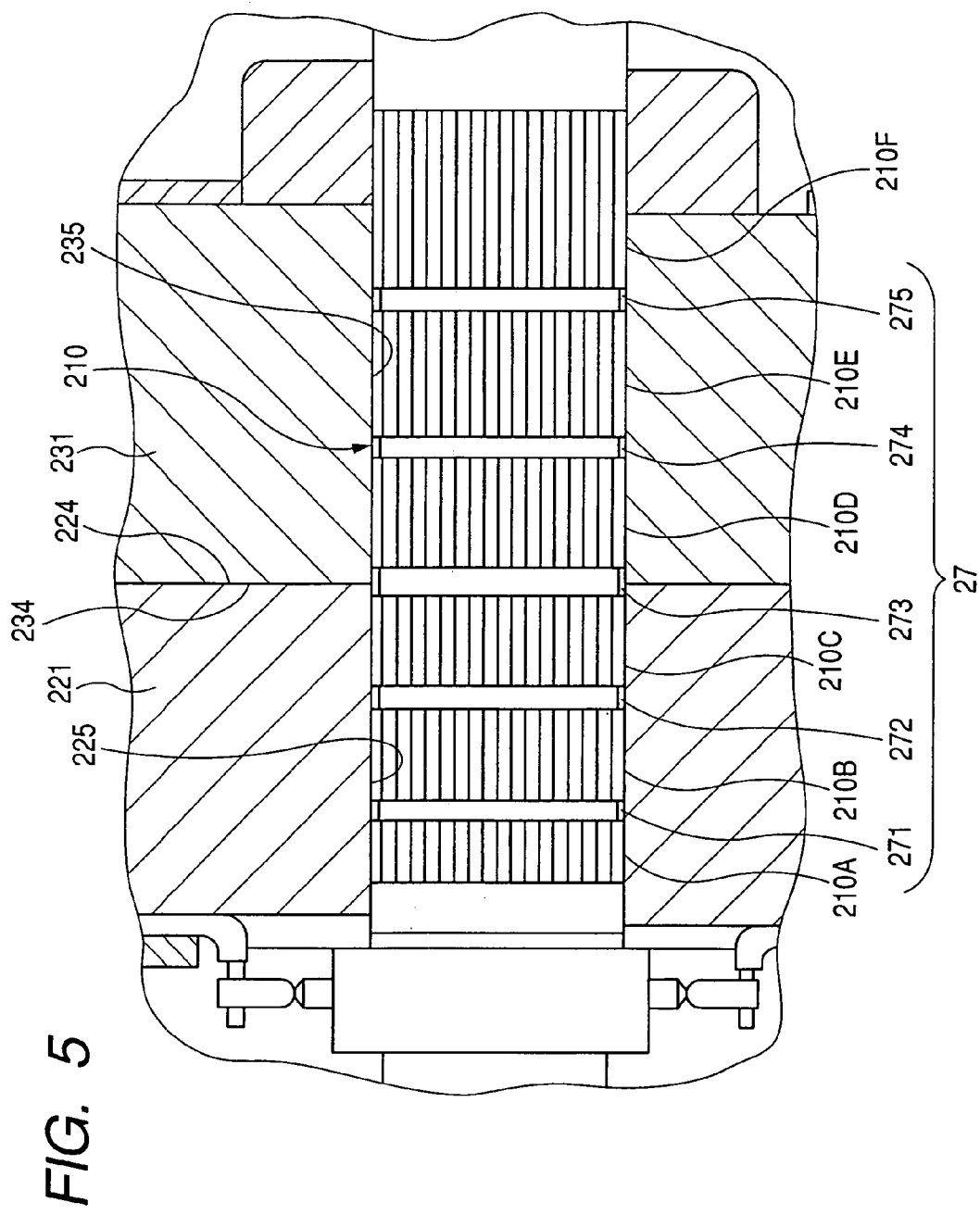
FIG. 5 is an enlarged axial cross-sectional view of a portion of a rotor according to a third embodiment of the present invention.

FIG. 5 shows in enlarged axial cross section a portion of a Lundell type rotor according to a third embodiment of the present invention.

In this embodiment, the shaft 21 has a plurality of narrow relief space portions 271 to 275 formed in a portion including the knurled groove 21, at a constant pitch in the axial direction of the shaft 21. By the relief space portions 271 to 275 thus provided, the knurled groove 210 is axially divided into a plurality of knurled groove portions or segments 210A to 210F of reduced lengths.

By thus providing the relief space portions 271-275, it is possible to reduce the axial movement distance of plastically deformed portions during press-fitting operation. In addition, since the relief space portions 271-275 are distributed at regular intervals over the knurled shaft portion (knurled groove) 210, the press-fitting operation can be achieved smoothly and easily without producing a gap between the pole cores, which may lead to an increase in magnetic resistance of the magnetic circuit.

Obviously, various minor changes and modifications are possible in the light of the above teaching. It is to be understood that within the scope of the appended claims the present invention may be practiced otherwise than as specifically described.

What is claimed is:

1. A rotor for a vehicular alternating current generator, comprising:
    a rotary shaft;
    a pair of Lundell type pole cores, each of the pole cores having an axial hole in which the rotary shaft is press-fitted;
    a field coil wound on the pair of Lundell type pole cores;
    axial inner end faces of the pair of Lundell type pole cores being in close contact with each other; and
    a relief space portion having an annular configuration with a larger diameter than the axial holes of the pair of Lundell type pole cores and formed adjacent the axial inner end faces between the axial holes of the pair of Lundell type pole cores and the rotary shaft, the relief space portion receiving therein a plastically deformed portion produced when the rotary shaft is press-fitted in the axial holes of the pair of Lundell type pole cores,
    the relief space portion having a same diameter and an average radial space width which is set to be larger than an average radial space width between the axial holes and the rotary shaft at a substantially press-fitted portion of the rotary shaft and the axial holes located axially outward of the relief space portion,
    wherein the diameter of the relief space portion being constant along an axial direction of the relief space portion.

2. The rotor according to claim 1, wherein the relief space portion is formed in a part of the axial holes.

3. The rotor according to claim 1, wherein the relief space portion is formed in a part of the rotary shaft.

4. The rotor according to claim 1, wherein the rotary shaft has a pair of knurled grooves formed on an outer peripheral surface thereof at both axially outer sides of the relief space portion and fitted in the respective axial holes of the pair of Lundell type pole cores, and a small-diameter portion disposed between the pair of knurled grooves and having a diameter smaller than an average diameter of the knurled grooves, and wherein the relief space portion is defined radially outward of the small-diameter portion of the rotary shaft.

5. The rotor according to claim 1, wherein the axial holes are made larger in diameter at a first portion located near the axial inner end faces than at a second portion located near axial outer end faces, the relief space portion is defined radially inward of the first portion of the axial holes, and the rotary shaft has a knurled groove on an outer peripheral surface thereof.

6. A rotor for a vehicular alternating current generator, comprising:

a rotary shaft;

a pair of Lundell type pole cores, each of the pole cores having an axial hole in which the rotary shaft is press-fitted;

a field coil wound on the pair of Lundell type pole cores;

axial inner end faces of the pair of Lundell type pole cores being in close contact with each other; and a plurality of knurled portions formed on an outer peripheral surface thereof at predetermined axial pitch, and a plurality of relief space portions having an annular configuration and each disposed between two adjacent ones of the knurled portions, wherein the relief space portions have a same diameter and an average radial space width, which is set to be larger than an average radial space width between the respective knurled portions and the axial holes, wherein the diameter of the relief space portion being constant along an axial direction of the relief space portion.

* * * * *